(12) United States Patent
Tsai

(10) Patent No.: US 10,915,003 B2
(45) Date of Patent: Feb. 9, 2021

(54) PROJECTING APPARATUS FOR 3D SENSING SYSTEM

(71) Applicant: HIMAX TECHNOLOGIES LIMITED, Tainan (TW)

(72) Inventor: Meng-Ko Tsai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 316 days.

(21) Appl. No.: 16/145,083

(22) Filed: Sep. 27, 2018

(65) Prior Publication Data
US 2020/0103723 A1    Apr. 2, 2020

(51) Int. Cl.
G02F 1/29      (2006.01)
G02B 27/42    (2006.01)
G01B 11/25    (2006.01)

(52) U.S. Cl.
CPC .......... G02F 1/292 (2013.01); G01B 11/2513 (2013.01); G02B 27/4233 (2013.01); G02F 2201/305 (2013.01)

(58) Field of Classification Search
CPC .............. G02B 27/425; G02B 27/4233; G01B 11/2513; G01B 11/2433; G01B 11/255; G01B 11/254; G01B 11/25; G02F 1/292
See application file for complete search history.

(56) References Cited

U.S. PATENT DOCUMENTS

| | | | |
|---|---|---|---|
| 2007/0076220 A1* | 4/2007 | Kawahara | G01B 9/02068 356/511 |
| 2016/0050401 A1* | 2/2016 | Gordon | G01B 11/2513 348/744 |
| 2019/0052863 A1* | 2/2019 | Yang | G01B 11/2509 |

FOREIGN PATENT DOCUMENTS

| | | |
|---|---|---|
| TW | 201510475 A | 3/2015 |
| TW | 201638555 A | 11/2016 |

* cited by examiner

*Primary Examiner* — William R Alexander
*Assistant Examiner* — Ephrem Z Mebrahtu
(74) *Attorney, Agent, or Firm* — Winston Hsu

(57) ABSTRACT

The present invention provides a projecting apparatus for a 3D sensing system. The projecting apparatus comprises: at least a light source and a patterning unit. The at least a light source is utilized for emitting beams with different wavelengths. The patterning unit is utilized for receiving the beams and imposing at least a pattern on the beams to generate a structure light with higher resolution.

10 Claims, 4 Drawing Sheets

PROJECTING APPARATUS FOR 3D SENSING SYSTEM

BACKGROUND OF THE INVENTION

1. Field of the Invention

The present invention relates to a projecting apparatus, and more particularly, to a projecting apparatus for a 3D sensing system to generate a structure light with higher resolution.

2. Description of the Prior Art

In general, a conventional projecting apparatus for a 3D sensing system comprises a single wavelength laser light source for emitting a beam with the same wavelength, and a diffractive optical element (DOE) for imposing only one pattern on the beam to generate a structure light. Please refer to FIG. 1. FIG. 1 shows a part (3×5 grid) of a pattern of the structure light generated by the conventional projecting apparatus. However, when the 3D sensing system requires another structure light with higher resolution, it is very difficult for the conventional projecting apparatus to generate the structure light with higher resolution by using the conventional projecting scheme.

SUMMARY OF THE INVENTION

It is therefore one of the objectives of the present invention to provide a projecting apparatus for a 3D sensing system to generate a structure light with higher resolution, so as to solve the above problem.

In accordance with an embodiment of the present invention, a projecting apparatus for a 3D sensing system is disclosed. The projecting apparatus comprises: at least a light source and a patterning unit. The at least a light source is utilized for emitting beams with different wavelengths. The patterning unit is utilized for receiving the beams and imposing at least a pattern on the beams to generate a structure light with higher resolution.

In accordance with an embodiment of the present invention, a projecting apparatus for a 3D sensing system is disclosed. The projecting apparatus comprises: a first light source, a second light source, and a patterning unit. The first light source is utilized for emitting a first beam with a first wavelength. The second light source is utilized for emitting a second beam with a second wavelength. The patterning element is utilized for receiving the beams and imposing at least a pattern on the first beam and the second beam to generate a structure light with higher resolution.

In accordance with an embodiment of the present invention, a projecting apparatus for a 3D sensing system is disclosed. The projecting apparatus comprises: a light source and a patterning unit. The light source is utilized for emitting a beam with a wavelength. The patterning unit is utilized for receiving the beam and imposing a plurality of different patterns on the beam to generate a structure light with higher resolution.

Briefly summarized, the projecting apparatus disclosed by the present invention can generate a structure light with higher resolution.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not function. In the following discussion and in the claims, the terms "include", "including", "comprise", and "comprising" are used in an open-ended fashion, and thus should be interpreted to mean "including, but not limited to . . . ".

Figure 1:
FIG. 1 shows a part (3×5 grid) of a pattern of the structure light generated by the conventional projecting apparatus.
Figure 1:
Figure 1:
Figure 1:
Figure 1:
Figure 1:
Figure 1:
Figure 1:
Figure 1:
Figure 1:
Figure 1:
Figure 1:
Figure 1:
Figure 1:
Figure 1:
Figure 2:
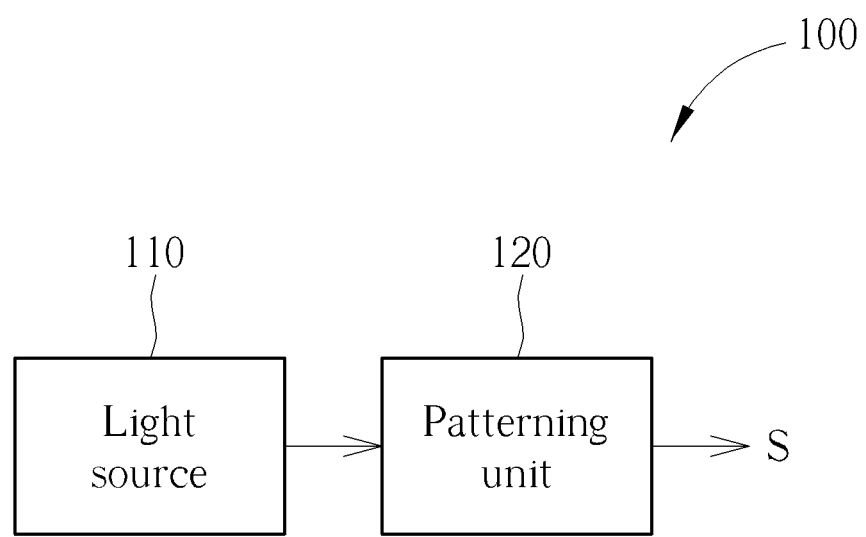
FIG. 2 shows a simplified block diagram of a projecting apparatus for a 3D sensing system in accordance with an embodiment of the present invention.
Figure 3:
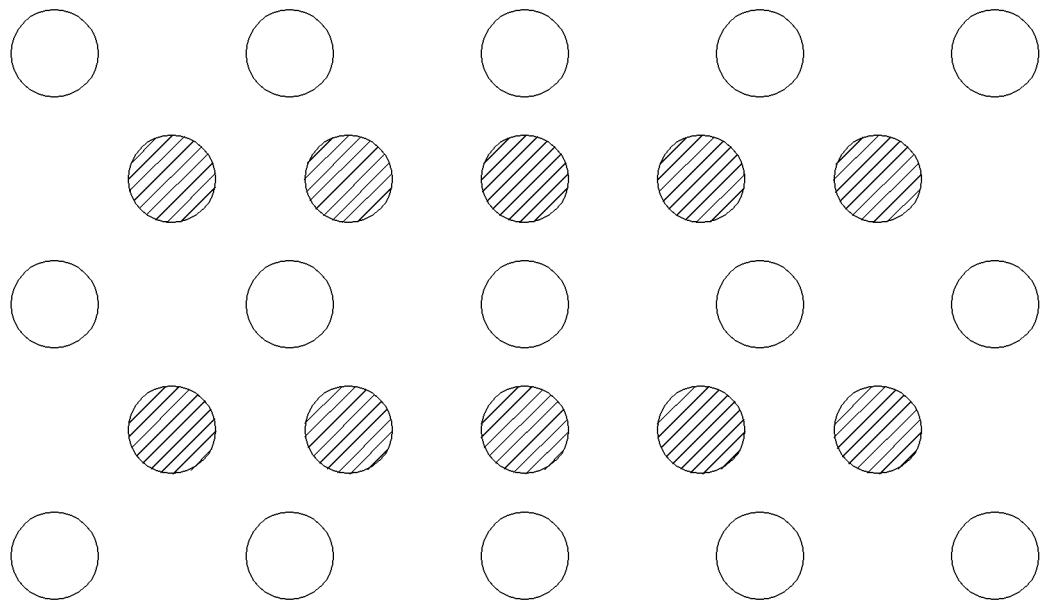
FIG. 3 shows a part (3×5 grid) of a pattern of the structure light in accordance with an embodiment of the present invention.

Please refer to FIG. 2. FIG. 2 shows a simplified block diagram of a projecting apparatus 100 for a 3D sensing system in accordance with an embodiment of the present invention. The projecting apparatus 100 comprises: alight source 110 and a patterning unit 120. The light source 110 is utilized for emitting beams with different wavelengths. The patterning unit 120 is utilized for receiving the beams and imposing a pattern on the beams to generate a structure light S with higher resolution, wherein the patterning unit 120 can be a diffractive optical element (DOE). In this embodiment, the light source 110 is a wavelength-switchable laser light source, and a wavelength switching frequency of the wavelength-switchable laser light source is higher than a sensor frequency of the 3D sensing system. The wavelength-switchable laser light source emits a first beam with a first wavelength and a second beam with a second wavelength, wherein the first wavelength is longer than the second wavelength. Please refer to FIG. 3. FIG. 3 shows a part (3×5 grid) of a pattern of the structure light S in accordance with an embodiment of the present invention. The dots in the first, third, and fifth rows of the pattern are generated by the first beam with the first wavelength, and the dots in the second and fourth rows of the pattern are generated by the second beam with the second wavelength. In this way, the projecting apparatus with multiple wavelengths design can generate the structure light with higher resolution than that in the prior art. Please note that the above embodiment is merely for an illustrative purpose and is not meant to be a limitation of the present invention. For example, the number of the beams with different wavelengths can be changed according to different design requirements.

Figure 4:
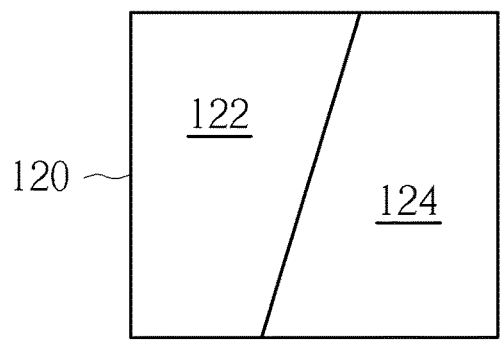
FIG. 4 shows a diagram of the patterning unit in accordance with an embodiment of the present invention.

In another embodiment, the patterning unit 120 can comprise a plurality of areas and each area has a specific pattern, and the light source 110 can only emit one beam with a wavelength. Please refer to FIG. 4. FIG. 4 shows a diagram of the patterning unit 120 in accordance with an embodiment of the present invention, wherein the patterning unit 120 can be a diffractive optical element (DOE). The patterning unit 120 comprises a first area 122 and a second area 124, wherein the first area 122 has a first pattern and the second area 124 has a second pattern. Thus, the patterning unit 120 can impose two different patterns on the beam to generate a structure light S with higher resolution as shown in FIG. 3, wherein the dots in the first, third, and fifth rows of the pattern can be generated by the first pattern of the first area 122, and the dots in the second and fourth rows of the pattern are generated by the second pattern of the second area 124. Moreover, in a variation of this embodiment, the light source 110 also can be a wavelength-switchable laser light source for emitting beams with different wavelengths, and the structure light S will have much higher resolution. Please note that the above embodiment is merely for an illustrative purpose and is not meant to be a limitation of the present invention. For example, the number of the areas of the DOE can be changed according to different design requirements.

In another embodiment, the patterning unit 120 can be an active DOE (such as a liquid crystal on silicon (LCOS)) to imposes a plurality of different patterns on the beam emitted by light source 110 to generate the structure light S with higher resolution, wherein a voltage switching frequency of the active DOE is higher than a sensor frequency of the 3D sensing system. Moreover, in a variation of this embodiment, the light source 110 also can be a wavelength-switchable laser light source for emitting beams with different wavelengths, and the structure light S will have much higher resolution.

Figure 5:
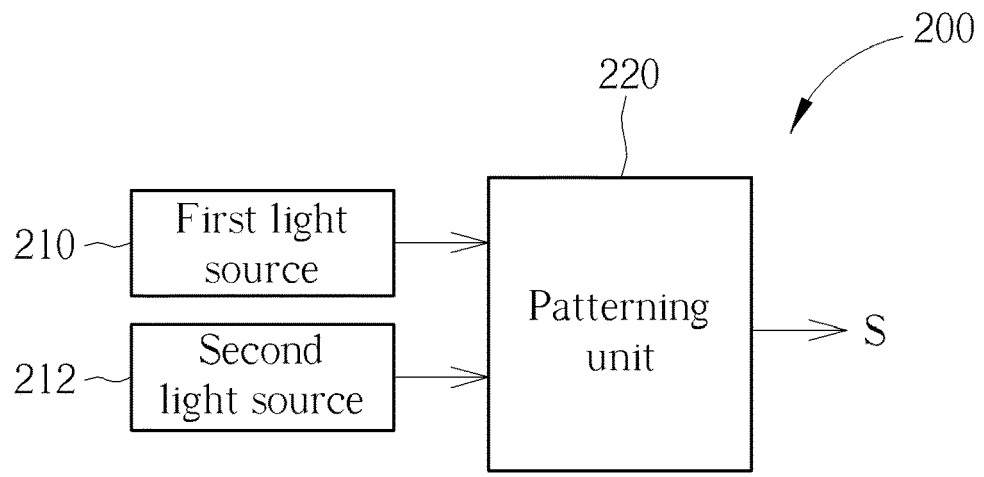
FIG. 5 shows a simplified block diagram of a projecting apparatus for a 3D sensing system in accordance with another embodiment of the present invention.

Please refer to FIG. 5. FIG. 5 shows a simplified block diagram of a projecting apparatus 200 for a 3D sensing system in accordance with another embodiment of the present invention. The projecting apparatus 200 comprises: a first light source 210, a second light source 212, and a patterning unit 220, wherein the first light source 210 and the second light source 212 can be laser light sources. The first light source 210 is utilized for emitting a first beam with a first wavelength. The second light source 212 is utilized for emitting a second beam with a second wavelength shorter than the first wavelength. The patterning element 220 is utilized for receiving the first beam and the second beam and imposing a pattern on the first beam and the second beam to generate a structure light S with higher resolution as shown in FIG. 3, wherein the dots in the first, third, and fifth rows of the pattern are generated by the first beam with the first wavelength, and the dots in the second and fourth rows of the pattern are generated by the second beam with the second wavelength.

Figure 6:
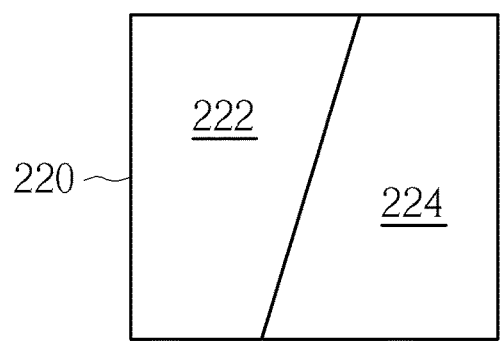
FIG. 6 shows a diagram of the patterning unit in accordance with an embodiment of the present invention.

In another embodiment, the patterning unit 220 can comprise a plurality of areas and each area has a specific pattern. Please refer to FIG. 6. FIG. 6 shows a diagram of the patterning unit 220 in accordance with an embodiment of the present invention, wherein the patterning unit 220 can be a DOE. The patterning unit 120 comprises a first area 222 and a second area 224, wherein the first area 222 has a first pattern and the second area 224 has a second pattern. Thus, the patterning unit 220 can impose two different patterns on the beam to generate a structure light S with much higher resolution. Moreover, in a variation of this embodiment, the first light source 210 and the second light source 212 also can be a wavelength-switchable laser light source for emitting beams with different wavelengths, and the structure light S will have much higher resolution. Please note that the above embodiment is merely for an illustrative purpose and is not meant to be a limitation of the present invention. For example, the number of the areas of the DOE can be changed according to different design requirements.

In another embodiment, the patterning unit 220 can be an active DOE (such as an LCOS) to imposes a plurality of different patterns on the beams to generate the structure light S with much higher resolution, wherein a voltage switching frequency of the active DOE can be higher than a sensor frequency of the 3D sensing system. Moreover, in a variation of this embodiment, the first light source 210 and the second light source 212 also can be a wavelength-switchable laser light source for emitting beams with different wavelengths, and the structure light S will have much higher resolution.

Briefly summarized, the projecting apparatus disclosed by the present invention can generate a structure light with higher resolution by lower cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projecting apparatus for a 3D sensing system, comprising:
   at least a light source, for emitting beams with different wavelengths; and
   a patterning unit, for receiving the beams and imposing at least a pattern on the beams to generate a structure light with higher resolution;
   wherein the at least a light source is a wavelength-switchable laser light source, and a wavelength switching frequency of the wavelength-switchable laser light source is higher than a sensor frequency of the 3D sensing system; and the patterning unit comprises a plurality of areas and each area has a specific pattern, and the patterning unit imposes a plurality of different patterns on the beams to generate the structure light with higher resolution.

2. The projecting apparatus of claim 1, wherein the patterning unit is a diffractive optical element (DOE).

3. The projecting apparatus of claim 1, wherein the patterning unit imposes a plurality of different patterns on the beams to generate the structure light with higher resolution.

4. The projecting apparatus of claim 3, wherein the patterning unit is an active DOE.

5. A projecting apparatus for a 3D sensing system, comprising:
   a first light source, for emitting a first beam with a first wavelength;
   a second light source, for emitting a second beam with a second wavelength;
   and
   a patterning element, for receiving the first beam and the second beam and imposing at least a pattern on the first beam and the second beam to generate a structure light with higher resolution;
   wherein the patterning unit imposes a plurality of different patterns on the first beam and the second beam to generate the structure light with higher resolution; and the patterning unit is an active DOE, and a voltage switching frequency of the active DOE is higher than a sensor frequency of the 3D sensing system.

6. The projecting apparatus of claim 5, wherein the patterning unit comprises a plurality of areas and each area has a specific pattern, and the patterning unit imposes a plurality of different patterns on the first beam and the second beam to generate the structure light with higher resolution.

7. The projecting apparatus of claim 5, wherein the patterning unit is a diffractive optical element (DOE).

8. A projecting apparatus for a 3D sensing system, comprising:
   a light source, for emitting a beam with a wavelength; and
   a patterning unit, for receiving the beam and imposing a plurality of different patterns on the beam to generate a structure light with higher resolution,
   wherein the patterning unit is an active DOE, and a voltage switching frequency of the active DOE is higher than a sensor frequency of the 3D sensing system.

9. The projecting apparatus of claim 8, wherein the patterning unit comprises a plurality of areas and each area has a specific pattern.

10. The projecting apparatus of claim 8, wherein the patterning unit is a diffractive optical element (DOE).

\* \* \* \* \*